May 3, 1966    J. WILLY    3,249,661
METHOD AND APPARATUS FOR CASTING
THIN CELLULAR FOAM SHEETS
Filed Dec. 10, 1962    2 Sheets-Sheet 2
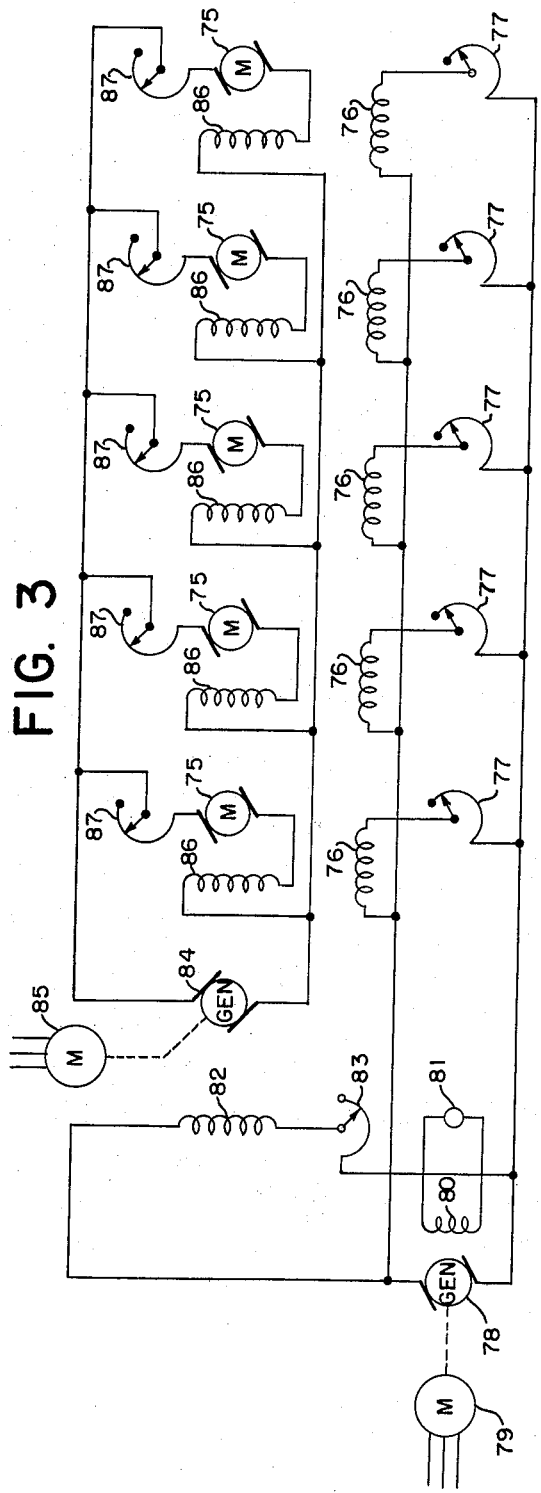
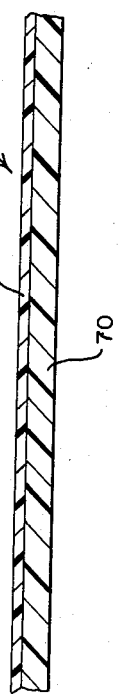
FIG. 4
INVENTOR.
JOHN WILLY
BY
ATTORNEYS

United States Patent Office 3,249,661
Patented May 3, 1966

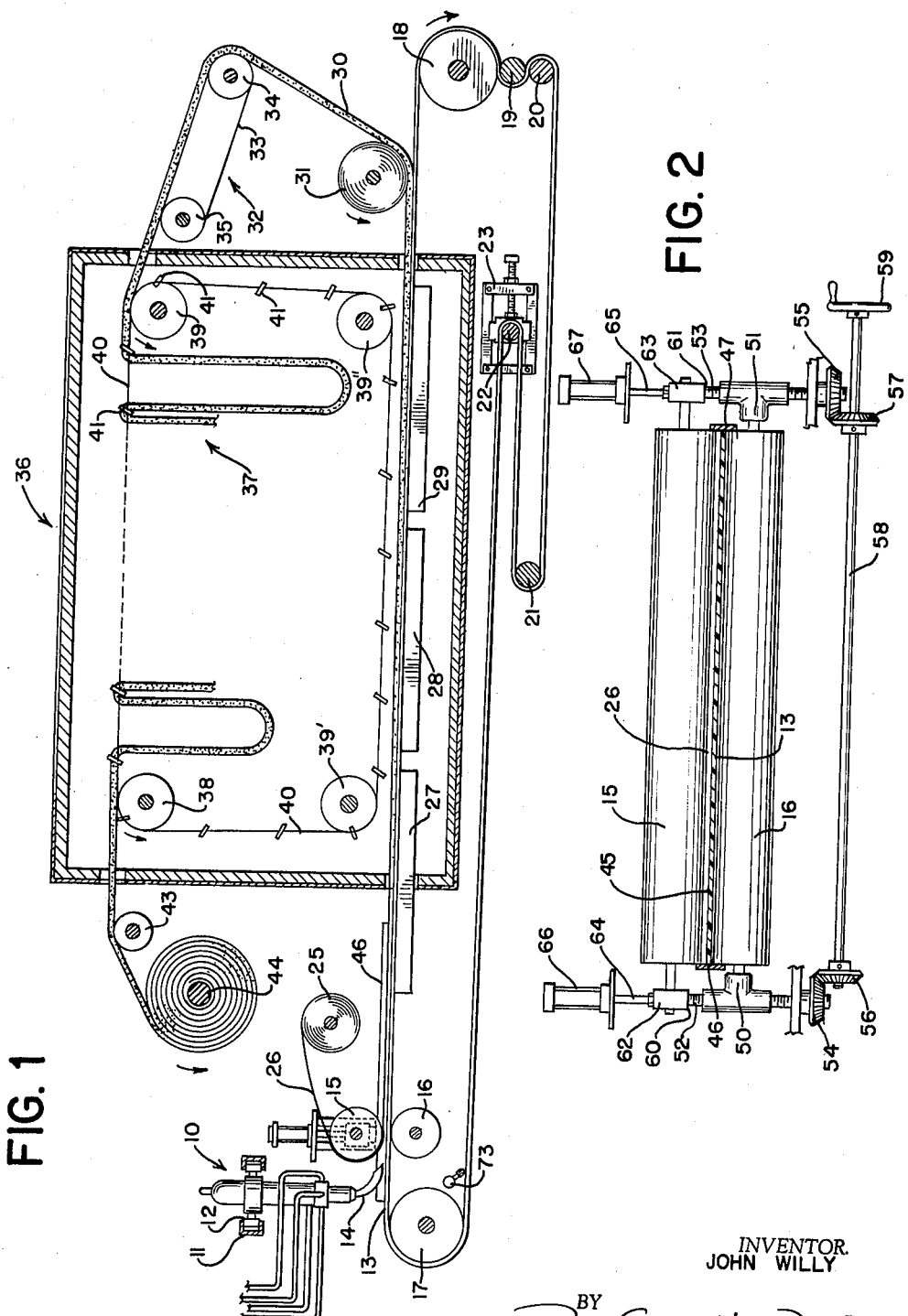

3,249,661
METHOD AND APPARATUS FOR CASTING THIN CELLULAR FOAM SHEETS
John Willy, Attleboro, Mass., assignor to Specialty Converters, Inc., a corporation of Delaware
Filed Dec. 10, 1962, Ser. No. 243,551
12 Claims. (Cl. 264—54)

This invention relates to the method of and apparatus for the continuous casting of thin cellular foam sheets. More particularly it relates to a method and to control means for regulating the thickness of the foam sheet to be formed. It further relates to other improvements in apparatus for forming a thin foam sheet.

In casting thin cellular polyurethane foam sheets in a continuous process, the most difficult problem is one of maintaining some degree of uniformity over the thickness of the foam sheet. From the moment the fluid chemical foaming mixture is discharged from a mixing head, it must be spread and metered by measuring its thickness, and somehow controlled so that upon gaseous expansion of the mixture a thin cellular sheet of uniform thickness will be formed. Owing to the many variables which enter into such a continuous casting process, a certain amount of control must be maintained over each of the operations both individually and as a unit in order to form thin foam sheets. It is an object of the invention to provide apparatus and methods which embody improvements and refinements to the extent that foam sheets can now be cast with sufficient uniformity to satisfy even the most demanding manufacturing dimensional tolerances, and on a production scale.

Broadly stated, the apparatus relates to control means for regulating the thickness of the foam sheet to be formed which is to be used with apparatus of the type having chemical foam mixture feed means, and moving carrier and cover sheets between which said chemical foam mixture is allowed to expand. The control means is comprised of first and second metering rolls adjacent the feed means with one of the metering rolls being movable toward and away from the stationary rolls. Pressure sensitive positioning means are connected to the movable metering roll to position the metering rolls in relation to each other by pressure. Adjustment means are also associated with the movable metering roll to maintain the rolls in fractional spaced relationship. The improved control means also provides a continuous self-supporting carrier below which has a surface that is resistant to adherence by the chemical foam mixture.

This control means for regulating the thickness of a foam sheet in a continuous casting process by controlling the metering rolls by pressure is an important contribution to the over-all smooth functioning of the apparatus. When chemical foam mixture is deposited on the carrier sheet in the usual manner of casting foam sheets, the prepolymer in the mixture has previously been cooled to a very low temperature in order to retard the chemical reaction between the prepolymer and the catalyst. This enables the mixture to be deposited and spread on a carrier sheet to a predetermiend thickness which, on expansion, will produce a foam sheet of a specified thickness. Obviously the resultant thickness is dependent upon the chemical composition of the foam mixture, the temperature at which the mixture is spread, and the stage at which the mixture is metered. Ordinarily if it is discovered that the foam sheets being formed do not have the desired thickness owing to a variance in one of the essential steps in the process, the apparatus must be stopped and a new setting made at the metering point. The apparatus is then run once again and it is only after the newly formed foam sheet is produced that the determination can be made as to whether the new metering setting was correct or not. If the setting is not accurate, the apparatus must be shut down once again and a new setting made. By the method and apparatus of the invention the apparatus can be run continously even while new settings are made. This not only permits adjustments for unpredictable variances in the process, but also allows the thickness of the resultant foam product to be varied by adjustment of the metering setting without stopping the apparatus.

The method of controlling the thickness of foam sheets is to be used in the process for casting thin cellular foam sheets wherein a chemical foaming mixture is spread and metered by a pair of metering members. The method comprises locating the metering members in relation to each other by pressure, controlling the pressure between said members in relation to the thickness desired in the resultant foam sheet, and expanding the foam mixture after passing between the metering members whereby a foam sheet having a substantially uniform thickness has been formed.

The invention also contemplates the use of a continuous self-supporting belt as the carrier belt which has one surface thereof that is resistant to the adherence of foam. It has particularly been found that a Fiberglas belt having a surface coating of polytetrafluoroethylene has proven satisfactory. The use of such a continuous belt which itself has a uniform thickness, contributes to the uniformity of the foam sheet to a greater degree than did a carrier belt made of wax coated paper which is not permanent and is subsequently discarded. Most important however, a continuous belt which is relatively permanent has the advantage of being more economical since it can be re-used extensively, and the tendency to rip or tear is negligible.

Applicant has also developed a method for using a carrier or cover sheet having a polytetrafluoroethylene surface to advantage. It has been found that by spreading a chemical foaming mixture between a cover and a carrier sheet and contacting the foaming mixture with a polytetrafluoroethylene surface provided on at least one of said carrier and cover sheets, and expanding the foaming mixture between the carrier and cover sheets, a skin having a substantially closed-cell structure is formed on that portion of the resultant sheet which contacts the surface during expansion. This skin effect has proven particularly useful in foam products when breathability is not required. For example, if the foam was applied to the back of a carpet with the carpet forming the carrier sheet and the cover sheet having a polytetrafluoroethylene surface, the skin effect would be produced on the surface of the foam away from the carpeting, thereby providing a tougher more durable surface to withstand the frictional abuse of contact with the flooring during its use.

In apparatus of the type described therein is generally provided a cover sheet drive, a carrier belt drive, a foam sheet stripper, and a foam sheet conveyor drive means in the curing oven. Each of these drives is in continuous operation during the operation of the apparatus, and the smooth and continuous operation of the apparatus is dependent on the interrelation of the drives. Nevertheless each of the drives does power an individual operation in the apparatus and each drive is thereby driven at a different speed from each other. Occasionally the speed of one of the drives must be varied in order to insure continuous operation of the apparatus. In this relation there is another important feature which forms a part of the invention. This relates to a control system by means of which all of the above-mentioned drives may be controlled individually or may be proportionately increased or decreased together. Owing to the variable conditions described above, a control system such as described above is essential to the continuous operation of such apparatus on a production scale. The control system of the invention permits increasing and decreasing the speed of the apparatus as a unit, as well as increasing or decreasing the speed of the drives individually as the conditions may require.

A preferred embodiment of the invention is described herein below with reference to the drawings wherein:

FIG. 1 is a side elevation of apparatus for casting thin cellular foam sheets;

FIG. 2 is an end elevation showing the metering rolls of the apparatus and the control means therefor;

FIG. 3 is a schematic electrical diagram of a preferred drive control arrangement; and FIG. 4 is an enlarged fragmentary cross-section of the continuous self-supporting belt.

Referring initially to FIG. 1, the apparatus shown consists of a mixing head 10 which is mounted on tracks 11 by means of rollers 12 to permit the head to be reciprocated transversely across the width of a carrier belt 13. Extending from the mouth of the mixing head 10 to a point immediately adjacent the carrier belt 13 is a curved feeding trough 14. The curved feeding trough 14, as shown, feeds the polyurethane foam mixture substantially tangentially between upper metering roll 15 and the carrier belt 13. Underlying the upper metering roll 15 is a lower metering roll 16. The carrier belt 13, which functions as a conveyor, is mounted to travel about an idler roll 17 which is positioned at the feed end of the apparatus, and travels on a drive roll 18 positioned at the discharge end of the apparatus. As shown, immediately after passing over the drive roll 18, the continuous belt travels sinuously through a pair of small guide rolls 19 and 20 mounted adjacent to the drive roll 18. The continuous belt then travels back toward the feed end of the apparatus and over an intermediate guide roll 21 where its direction is reversed causing the belt to travel once again toward the discharge end of the apparatus. Before reaching the discharge end of the apparatus, the carrier belt travels around a linearly adjustable roll 22 thereby reversing the direction of the belt once again and causing it to travel to the feed end of the machine and over the idler roll 17. Suitable adjusting means 23 are connected to the adjustable roll 22 thereby enabling the carrier belt to be lengthened or shortened without need of replacement. This permits the continuous belt to be spliced and shortened in the event of damage to any part of the belt, without requiring discarding of the entire belt in the event of damage to a portion thereof.

A supply roll 25 is mounted adjacent the mixing head 10 and contains thereon a supply of cover sheeting 26. The cover sheet 26 and the carrier belt 13 are both fed through the nip between the metering rolls 15 and 16 such that the foam mixture is contained therebetween.

Once the cover sheet 26 and the carrier belt 13 pass through the metering rolls 15 and 16, gaseous expansion begins to occur within the foaming mixture contained therebetween, causing a foam sheet to be formed between the carrier belt 13 and the cover sheet. At this point the expanding mixture is passed through heating zones 27, 28 and 29 which contain electrical heating elements aligned in succession so as to advance the chemical reaction of the formation mixture and to render the foam sheet self-supporting and non-tacky by the time it passes from the final heating zone 29. The cover sheet 26 is then stripped from the resultant foam sheet 30 and is wound onto a carrier sheet supply roll 31, which supply roll is driven by any suitable drive means. The carrier belt 13 is simultaneously stripped from the foam sheet 30 and travels about the carrier sheet drive roll 18. The foam sheet 30 is fed to a smaller conveyor arrangement 32 which consists of a belt 33, an idler roll 34 and a drive roll 35. This conveyor arrangement 32 serves to pull the foam sheet 30 away from the carrier belt 13 and the cover sheet 26. This conveyor arrangement 32 also transfers the foam sheet 30 to a final curing oven 36. The oven 36 is maintained at a temperature high enough to effect final curing of the foam sheet 30. Contained within the oven 36 is a festoon-type conveyor arrangement 37. The festoon-type conveyor arrangement 37 is comprised of drive pulley 38 and idler pulleys 39, 39' and 39'' over which are mounted two continuous parallel chains 40 (one of which is shown). These chains 40 are spaced from each other and support transverse supporting elements 41 which extend across and are supported by the parallel chains 40. The transverse supporting elements 41 are in longitudinal spaced relationship with each other and accordingly, as the foam sheet 30 is passed through the oven 36, this foam sheet is draped over transverse elements 41 such that a major portion of the foam sheet 30 is allowed to hang in a festoon-like drape between two transverse elements 41. Obviously, the festoon-type arrangement 37 is driven at a much slower speed than the foam take-off arrangement 32. At the outlet end of the oven 36, the foam sheet is removed from the oven and passed over a guide roll 43 and is wound onto a wind-up roll 44.

Referring now to FIG. 2, the upper metering roll 15 is shown mounted above the lower metering roll 16 with a fractional aperture therebetween, which is generally referred to as the nip. As shown in section, contacting the lower metering roll 16 at the nip is the continuous carrier belt 13, and contacting the upper metering roll 15 is the cover sheet 26. Disposed between the carrier belt 13 and the cover sheet 26 is a small thickness of foam mixture 45. Shown on the respective transverse sides of the metering rolls are elongated longitudinally extending edge guide members 46 and 47 which serve as additional edge guides to prevent the foam mixture in its fluid state from becoming deposited beyond the width of the carrier belt 13.

The lower metering roll 16 is journaled within bearings members 50 and 51 and is rotatable therein in this fixed position. Extending substantially through bearings members 50 and 51 are threaded shafts 52 and 53. The threaded shafts have bevel gears 54 and 55 mounted at the lower end thereof in fixed relationship to the respective shafts. In meshed relationship with the bevel gears 54 and 55 are a pair of pinion gears 56 and 57. The pinion gears 56 and 57 are mounted on a transverse shaft 58 which has a handle 59 on one end thereof to permit turning of the shaft. Ends 60 and 61 of the threaded shafts 52 and 53 opposite to the end on which the gears 54 and 55 are mounted are in an abutting relationship with bearings 62 and 63. The upper metering roll 15 is journaled within the bearings 62 and 63 which sit on the ends 60 and 61. The bearings 62 and 63 are respectively connected to pistons 64, 65 of bellows-type air cylinders 66 and 67. The air cylinders are connected to a suitable air supply source, so that by varying the air pressure at its source, the pistons of the air cylinders can be raised or lowered. Of course, any fluid pressure cylinders can be used.

In operation of the metering roll control means, a handle 59 is rotated, thereby causing the thread shafts 52 and 53 to be raised or lowered fractionally. The bellows-type air cylinders 66 and 67 have been activated by controlling the air thereto and causing the upper metering roll 15 to be raised and thereby causing the bearings 62 and 63 to be unseated from the ends 60 and 61 of the shafts 52 and 53. Once the desired setting of the threaded shafts 52 and 53 has been made, the air cylinders 66 and 67 are released causing the bearings 62 and 63 to seat once again on the ends 60 and 61 so as to provide the desired aperture between the upper and lower metering rolls 15 and 16. It is to be noted that the upper metering roll 15 can be raised away from the lower metering roll 16 while the machine is being operated continuously, and without interfering with the continuous operation of the machine. By this means substantial control is maintained over the metering rolls thereby giving exceptional control at perhaps the most critical operation in the apparatus.

By eliminating the shafts 52 and 53, or by lowering them substantially, this same apparatus can be used for metering the thickness of the foam sheet with a zero nip setting. This is done by activating the air cylinders so that the upper metering roll 15 is urged toward the lower metering roll 16 at a constant pressure. By means of this positive pressure between the metering rolls, only a controlled amount of foam mixture will be carried through the rolls between the carrier and cover sheets. The thickness of the foam mixture will be dependent upon the pressure, and accordingly by controlling the fluid pressure to the cylinders, which can easily be done with this apparatus, the thickness of the resultant foam sheet can be metered by pressure.

As shown in FIG. 4, the carrier belt 13 is preferably a laminate structure having a first supporting layer 70 of Fiberglas and a second surface layer 71 of polytetrofluoroethylene. The surface coating of polytetrafluoroethylene is preferred as the surface layer because it wholly resists adherence of the foam thereto to the extent that it cannot be stripped from the carrier belt 13. It is also preferred since as described previously, the portion of the foam sheet which was in contact with the polytetrofluoroethylene surface is cast with a substantially closed cell skin effect which is less permeable to air than the rest of the foam sheet.

As the carrier belt 13 travels from the discharge end of the apparatus to the idler roll 17 at the feed end of the apparatus, the supporting surface layer 70 faces upwardly for a substantial length of the apparatus and thus, there is an opportunity and a tendency for foreign particles to seat on the belt during this length of travel. If these particles are not removed prior to the belt traveling over the idler roll 17 at the feed end of the apparatus, the foreign particles will become lodged between the idler roll and the carrier belt. Since the carrier belt does travel over the idler roll with substantial tension at this point it is likely that the particles could be forced through the belt causing tears or pin holes, or in some other manner damage the belt. For this reason a pneumatic air jet 73 is positioned adjacent the idler roll and is directed to below a continuous stream of air over the carrier belt 13 so as to remove any particles prior to traveling over the idler roll.

FIG. 3 shows a Ward-Leonard system providing adjustable speed control of the five D.C. drive motors 75 attached to the carrier belt drive 18, the cover sheet drive 31, the foam sheet take-off drive 35, the festoon-type conveyor drive 38 and the cured foam sheet wind-up drive 44. Each motor has a field winding 76 connected in series with a rheostat 77 all connected in shunt across the output of a D.C. generator 78 driven by a synchronous motor 79 connected to the A.C. mains. The generator field winding 80 is connected to a direct current source 81. Generator 78 powers a field winding 82 connected in series with the rheostat 83. Field winding 82 excites generator 84 driven by motor 85 also connected to the power mains. The output potential of generator 84 is dependent upon the position to which rheostat 83 is adjusted. The armatures of motors 75 are connected in series to windings 86 and rheostats 87 across the output terminals of generator 84. By adjustment of the individual rheostats 87, the speed of the individual motor may be adjusted. The voltage across the terminals of the motors 75, the current therethrough, and the speed thereof of the motor are all inversely proportional to the resistance connected in series with the armature. The windings 86 provide additional series field connections for providing excitation of the motor.

Adjustment of the rheostat 83 changes the potential across the armatures of all the motors simultaneously and proportionally so that a proportional adjustment of the speed of the drives attached thereto is provided. Adjustment of a rheostat 77 changes the field of a particular motor 75 independently of the other motors. The base speed of the motor may be defined as the normal armature voltage, full-field speed of the motor. Speeds above the base speed are obtained by adjusting the motor field rheostat thereby decreasing the field. Speeds below the base speed are obtained by decreasing the voltage across the armature either by reducing the output potential of generator 84 or increasing the resistance of rheostat 87.

It is clear that by means of this system unusually good control can be maintained over each of the drives, and each may be adjusted either proportionately or alone in an efficient and economical system, thereby providing means for controlling the drives of the apparatus which enables a uniform thin foam sheet to be cast.

I claim:

1. In casting thin cellular foam sheet, wherein a chemical foam mixture is spread and metered by a pair of metering members, the improvement in combination therewith of a method of controlling the thickness of the resultant foam sheet comprising, locating the metering members in relation to each other by pressure, adjusting the pressure to limit the amount of foam mixture which can pass between said members and thereby determine the thickness of the resultant foam sheet, and expanding the foam mixture after passing between the metering members.

2. In continuously casting thin cellular foam sheets wherein a chemical foam mixture is spread between a carrier and a cover sheet and metered between a pair of metering rolls through which said sheets pass with the foam mixture therebetween, the improvement in combination therewith of a method of controlling the thickness of the resultant foam sheets comprising constantly urging said metering rolls together by pressure, adjusting the amount of pressure to limit the amount of foam mixture which can pass between said rolls and thereby determine the thickness of the resultant foam sheet, and expanding the foam mixture which is allowed to pass through the metering rolls under pressure.

3. In continuously casting thin cellular foam sheets wherein a chemical foam mixture is spread between a carrier and a cover sheet and metered between a pair of metering rolls through which said sheets pass with the foam mixture therebetween, the improvement in combination therewith of a method of controlling the thickness of the resultant foam sheets comprising, maintaining a predetermined separation between said metering rolls, constantly urging said metering rolls together by pressure, adjusting the amount of pressure to limit the amount of foam mixture which can pass betwen said rolls and thereby determine the thickness of the resultant foam sheet, and expanding the foam mixture which is allowed to pass through the metering rolls between the carrier and cover sheets.

4. In continuously casting thin cellular foam sheets wherein a chemical foam mixture is spread between a continuous carrier belt and a cover sheet and metered between a pair of metering rolls through which said sheets pass with the foam mixture therebetween, the improvement in combination therewith of a method of controlling the thickness of the resultant foam sheets comprising, maintaining a predetermined separation between said metering rolls so that a space is also maintained between said continuous carrier belt and said cover sheet, adjusting the amount of pressure to limit the amount of foam mixture which can pass between said rolls and thereby determine the thickness of the resultant foam sheet, and expanding the foam mixture which is allowed to pass through the metering rolls between the carrier and cover sheets.

5. In apparatus for continuously casting thin cellular foam sheets of the type having a moving carrier and cover sheet between which a foam mixture is allowed to expand, chemical foam mixture feed means for spreading foam mixture on the carrier sheet, the improvement in combination therewith of control means for regulating the thickness of the foam sheet to be formed comprising first and second metering members adjacent said feed means for limiting the amount of unreacted foam mixture passing therebetween so as to determine the thickness of the foam sheet formed upon subsequent reaction of the foam mixture between the carrier and cover sheets, one of said metering members mounted for movement toward and away from the other, a nip defined between the metering members through which the carrier and cover sheets pass with the foam mixture therebetween, and pressure means connected to said movable member for maintaining a positive pressure on the movable metering member to urge it toward the other metering member against the moving carrier and cover sheets passing through the nip to control by pressure the thickness of the foam mixture positioned between the carrier and cover sheets as it is fed through the remainder of the apparatus.

6. In apparatus for continuously casting thin cellular foam sheets of the type having a moving carrier and cover sheet between which a foam mixture is allowed to expand, chemical foam mixture feed means for spreading foam mixture on the carrier sheet, the improvement in combination therewith of control means for regulating the thickness of the foam sheet to be formed comprising first and second metering members adjacent said feed means for limiting the amount of unreacted foam mixture passing therebetween so as to determine the thickness of the foam sheet formed upon subsequent reaction of the foam mixture between the carrier and cover sheets, one of said metering members mounted for movement toward and away from the other, a nip defined between the metering members through which the carrier and cover sheets pass with the foam mixture therebetween, and pressure means connected to said movable member for maintaining a positive pressure on the movable metering member to urge it toward the other metering member against the moving carrier and cover sheets passing through at the nip and to control by pressure the thickness of foam mixture positioned between the carrrier and cover sheets as it is fed through the remainder of the apparatus, and adjustment means associated with said movable metering roll for maintaining said rolls in fractional spaced relationship against the pressure of the movable roll.

7. In apparatus for continuously casting thin cellular foam sheets of the type having a moving carrier and cover sheet between which a foam mixture is allowed to expand, chemical foam mixture feed means for spreading foam mixture on the carrier sheet, the improvement in combination therewith of control means for regulating the thickness of the foam sheet to be formed comprising first and second metering members adjacent said feed means, for limiting the amount of unreacted foam mixture passing therebetween so as to determine the thickness of the foam sheet formed upon subsequent reaction of the foam mixture between the carrier and cover sheets, one of said metering members mounted for movement toward and away from the other, a nip defined between the metering members through which the carrier and cover sheets pass with the foam mixture therebetween, and pressure means connected to said movable member for maintaining a positive pressure on the movable metering member to urge it toward the other metering member against the moving carrier and cover sheets passing through at the nip to control by pressure the thickness of foam mixture positioned between the carrier and cover sheets as it is fed through the remainder of the apparatus, and a continuous self-supporting carrier belt having a surface which is resistant to adherence by said chemical foam mixture.

8. Apparatus as in claim 7 wherein said foam resistant surface of the continuous belt is polytetrafluoroethylene.

9. Apparatus as in claim 7 wherein said belt is comprised of Fiberglas and has a surface coating of polytetrafluoroethylene.

10. In apparatus for continuously casting thin cellular foam sheets of the type having a moving carrier and cover sheet between which a foam mixture is allowed to expand, chemical foam mixture feed means for spreading foam mixture on the carrier sheet, a stripper for the foam sheets formed from at least one of the carrier and cover sheets, cover sheet drive means, carrier sheet drive means, and foam sheet stripper drive means, the improvement in combination therewith of control means for regulating the thickness of the foam sheet to be formed comprising first and second metering members adjacent said feed means for limiting the amount of unreacted foam mixture passing therebetween so as to determine the thickness of the foam sheet formed upon subsequent reaction of the foam mixture between the carrier and cover sheets, one of said metering members mounted for movement toward and away from the other, a nip defined between the metering members through which the carrier and cover sheets pass with the foam mixture therebetween, pressure means connected to said movable member for maintaining a positive pressure on the movable metering member to urge it toward the other metering member against the moving carrier and cover sheets passing through at the nip to control by pressure the thickness of foam mixture positioned between the carrier and cover sheets as it is fed through the remainder of the apparatus, and drive regulating means for selectively controlling the speed of all of the drive means individually and together.

11. In apparatus for continuously casting thin cellular foam sheets of the type having a moving carrier and cover sheet between which a foam mixture is allowed to expand, chemical foam mixture feed means for spreading foam mixture on the carrier sheet, a stripper for stripping the foam sheet from at least one of the carrier and cover sheets, cover sheet drive motor, carrier sheet drive motor, and foam sheet stripper drive motor, the improvement in combination therewith of drive regulating means comprising individual potential adjustors connected to each of said motors to regulate the speed of the respective motors, and a main potential adjustor interconnecting all of said motors whereby change of the potential by the main adjustor changes the speed of each of said motors in proportion to the other.

12. In apparatus for continuously casting thin cellular foam sheets of the type having a moving carrier and cover sheet between which a foam mixture is allowed to expand, chemical foam mixture feed means for spreading foam mixture on the carrier sheet, the improvement in combination therewith of control means for regulating the thickness of the foam sheet to be formed comprising a first movable metering roll and a second stationary metering roll adjacent said feed means for limiting the amount of unreacted foam mixture passing therebetween so as to determine the thickness of the foam sheet formed upon subsequent reaction of the foam mixture between the carrier and cover sheets, said movable metering roll mounted for movement toward and away from the other metering roll, a nip defined between the metering members through which the carrier and cover sheets pass with the foam mixture therebetween, air cylinder means connected to said movable member for maintaining a pressure on the movable metering roll to urge it toward the other metering member against the moving carrier and cover sheets passing through at the nip to control by pressure the thickness of foam mixture positioned between the carrier and cover sheets as it is fed through the remainder of the apparatus, and a source of air pressure connected to said air cylinders for actuating the cylinders and moving the movable metering roll toward and away from the stationary metering roll.

References Cited by the Examiner

UNITED STATES PATENTS

| | | | |
|---|---|---|---|
| 1,365,711 | 1/1921 | McKay | 156—246 XR |
| 2,511,703 | 6/1950 | Ettl | 156—555 XR |
| 2,762,077 | 9/1956 | Markowitz | 264—40 |
| 2,841,205 | 7/1958 | Bird | 264—47 |
| 2,929,793 | 3/1960 | Hirsh | 264—54 |
| 2,956,307 | 10/1960 | Fahrni | 264—40 XR |
| 2,956,310 | 10/1960 | Roop et al. | 264—54 |
| 2,957,207 | 10/1960 | Roop et al. | 264—54 |
| 3,007,200 | 11/1961 | Paulsen et al. | |
| 3,047,449 | 7/1962 | Coble | 264—47 |
| 3,049,463 | 8/1962 | Kallander et al. | 156—78 XR |
| 3,147,164 | 9/1964 | Adams | 264—47 XR |

FOREIGN PATENTS 405,659   2/1934   Great Britain.

ALEXANDER H. BRODMERKEL, *Primary Examiner.*

P. E. ANDERSON, *Assistant Examiner.*